UNITED STATES PATENT OFFICE.

D. H. FITCH, JR., OF LITCHFIELD, ILLINOIS.

IMPROVEMENT IN LIQUIDS FOR GALVANIC BATTERIES.

Specification forming part of Letters Patent No. 38,894, dated June 16, 1863; Reissue No. 1,537, dated September 15, 1863.

*To all whom it may concern:*

Be it known that I, D. H. FITCH, Jr., of Litchfield, in the county of Montgomery, in the State of Illinois, have discovered a new and improved compound, which I term "Galvanic Compound," for uniting with the hydrogen disengaged during the action of galvanic batteries; and I do hereby declare that the following is a full and exact description thereof, reference being had to the samples of the ingredients and of the compound contained in bottles, and marked severally "Chlorate of Potassa," "Water," "Sulphuric Acid," and "D. H. Fitch, Jr.'s Galvanic Compound," which accompanied my former application.

The nature of my discovery consists in producing a compound easily decomposed, the elements of which have a strong affinity of hydrogen. The ingredients of the compound are chlorate of potassa, (or any known chlorate which is substantially the same,) sulphuric acid, and water. The chlorate is decomposed by the sulphuric acid, liberating chlorous or chloric acid, the elements of which have but a feeble affinity for each other, but each element of which has a strong affinity for hydrogen. The water absorbs and holds in solution the chlorous or chloric acid.

To enable others skilled in the art to make and use my compound, I will proceed to describe my mode of making and using it.

I take a porous cup, of the size and form generally used in what is known as the "Grove battery," and into it I put from six to twelve drams of chlorate of potassa or its equivalent of any known chlorate which is substantially the same. I next put into it about five drams, by measure, of water. I then add about eleven drams, by measure, of sulphuric acid. It is then ready for use. I use it in connection with the negative plate. The proportions of water and sulphuric acid may be varied in proportion to the amount of chlorate used, using more acid and less water as the amount of chlorate is increased. I have adopted this mode as being the most convenient, as the compound is made in the same vessel in which it is to be used. It can be made as well in other vessels and in larger quantities by observing the same proportions.

What I claim as my discovery, and desire to secure by Letters Patent, is—

1. The use of chlorate of potassa in combination with sulphuric acid and water, for the purpose specified.

2. The use of the salts of chloric acid in combination with sulphuric acid and water, for the purpose specified, their action being substantially the same as chlorate of potassa.

3. The use of chloric acid, when obtained by the decomposition of a chlorate by sulphuric acid, for the purpose specified.

I claim nothing in the form or mechanical construction of the battery.

D. H. FITCH, JR.

Witnesses:

A. KEELER,

MARK P. MILLER.